United States Patent Office 2,820,036
Patented Jan. 14, 1958

---

2,820,036

DYESTUFFS OF THE BENZIMIDAZO-BENZISO-QUINOLINES

Wilhelm Schmidt-Nickels, Little York, N. J., assignor to General Aniline & Film Corporation, New York, N. Y., a corporation of Delaware No Drawing. Application May 24, 1956
Serial No. 586,905

11 Claims. (Cl. 260—272)

This invention relates to vat dyestuffs and relates more particularly to new and valuable vat dyestuffs which yield colorations of good fastness on materials of vegetable fibers, such as cotton, ranging from reddish brown to deep chocolate brown.

An object of this invention is the provision of new and valuable vat dyestuffs containing the 1,8-naphthoylene-benzimidazole group.

Another object of this invention is the provision of a process for the preparation of the new dyestuffs containing the 1,8-naphthoylene-benzimidazole group in a simple and expeditious manner.

Other objects of this invention will appear from the following detailed description and claims.

I have found that compounds of the general structure

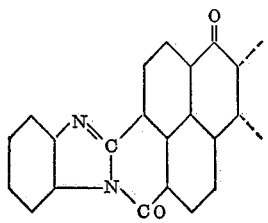

wherein the two dotted lines can form ring systems with thionaphthene, carbazole, biphenylene sulfide, fluoranthene and other carbocyclic and heterocyclic compounds which are capable of giving the Friedel-Crafts reaction, are valuable vat dyestuffs which dye cotton materials in colors of good fastness especially to light and chlorine, ranging from reddish brown to deep chocolate brown.

The new vat dyestuffs of this invention may be prepared from the new intermediates described in my copending application S. No. 586,916 filed on even date herewith. 1,8 - naphthoylene-benzimidazole-4-carboxylic acid chloride is reacted with compounds of the group consisting of thionaphthene, carbazole, biphenylene sulfide, fluoranthene or other carbocyclic and heterocyclic compounds with unsubstituted ortho-positions which are capable of giving the Friedel-Crafts reaction, in presence of anhydrous aluminum chloride and a solvent at temperatures of 65 to 90° C., and the subsequent ring-closure of the ketones thus formed is effected in a melt of anhydrous aluminum chloride and alkali chloride, such as sodium or potassium chloride in presence, or in some cases also in absence, of oxygen at temperatures of 140 to 210° C.

The method of preparing the vat dyestuffs of this invention, employing thionaphthene as the Friedel-Crafts coreactant, is illustrated by the following formulas:

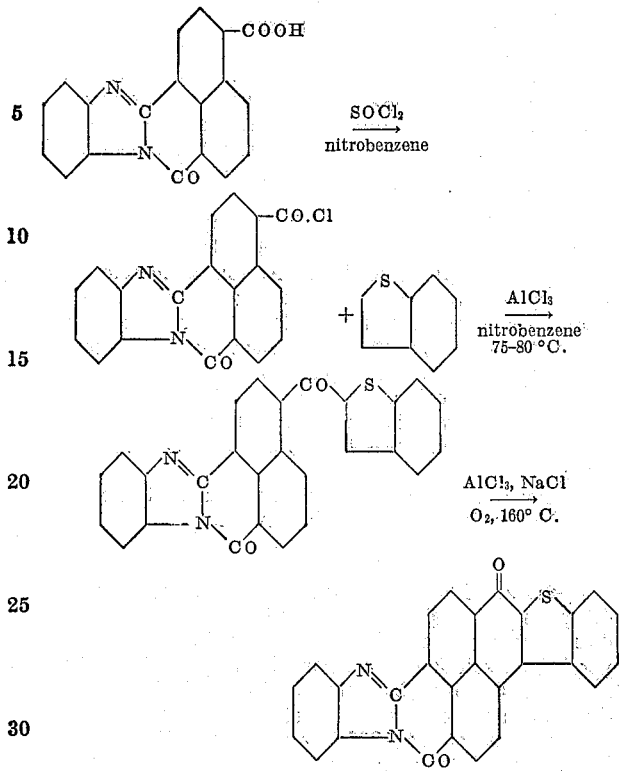

It is to be understood that all compounds described herein can be composed of isomers, for example:

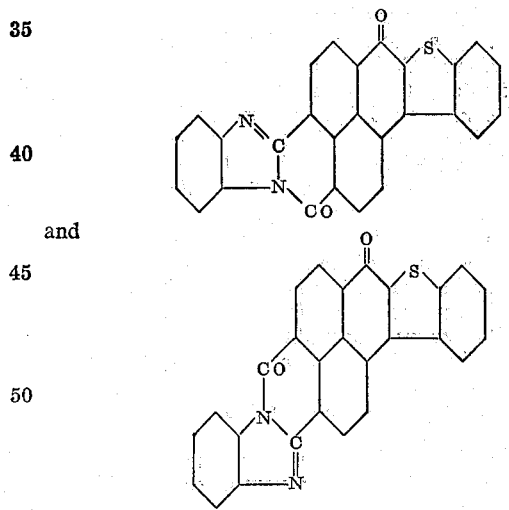

The higher molecular configurations were found to be best for use in printing.

The instant invention is further illustrated by the following examples which are not intended to be in any way limitative.

*Example I*

A charge of 45 parts by volume of nitrobenzene, 3.4 parts by weight of 1,8-naphthoylene-benzimidazole-4-carboxylic acid chloride, (prepared as described in my said copending application S. No. 586,916) 12.3 parts by weight of anhydrous aluminum chloride and 1.4 parts by weight of thionaphthene was stirred at 75–80° C. for 3 hours. The mass was poured in water and, after addition of 5 parts by volume of concentrated hydrochloric acid, the mixture was steam distilled until all of the nitrobenzene was removed. Then the ketone was filtered off and examined for the presence of unreacted 1,8-naphthoylene-benzimidazole-4-carboxylic acid (from its chloride by saponification) by stirring it in 150 parts by volume of water and 30 parts by volume of concentrated ammonia (28%) at 70 C. for ½ hour. The ketone was filtered off at 70° C., washed neutral and dried. This ketone did not give a vat with alkaline hydrosulfite.

Weight obtained = 4.3 parts by weight or 98% of the theory of $C_{27}H_{14}O_2N_2S$. The ammonia filtrate gave no precipitate on acidification indicating the absence of unreacted 1,8-naphthoylene-benzimidazole-4-carboxylic acid.

The cyclization of the above ketone was effected as follows:

A mixture of 54 parts by weight of anhydrous aluminum chloride and 12 parts by weight of sodium chloride was heated to a melt of 160° C. At this temperature 3.5 parts by weight of the above ketone was added to the melt. The mass was agitated at 160° C. for 5 hours while a fast stream of oxygen was conducted into it. Finally, the reaction product was poured and worked into a total of 250 parts by volume of water and 13 parts by volume concentrated hydrochloric acid. After boiling for 10 minutes the dyestuff was filtered off, washed neutral and dried.

Weight obtained = 3.4 parts by weight. Cotton was dyed brown from a reddish brown vat.

*Example II*

A charge of 50 parts by volume of nitrobenzene, and 4.1 parts by weight of 1,8-naphthoylene-benzimidazole-4-carboxylic acid was heated to 192° C. At this temperature, a solution of 4.6 parts by volume of nitrobenzene and 4.6 parts by volume of thionyl chloride was dropped into it over a period of 17 minutes. Agitation was continued at 175-180° C. for ½ hour. Then air was blown through the mixture at 150° C. for 12 minutes to remove the excessive thionyl chloride. Finally the mass was allowed to cool to room temperature. Amounts of 12.2 parts by weight of anhydrous aluminum chloride and 1.0 part by weight of carbazole were added. After stirring at 75-80° C. for 3 hours the reaction mixture was poured into water and, after addition of 5 parts by volume of concentrated hydrochloric acid the mixture was steam distilled until all of the nitrobenzene was removed. Then the ketone was filtered off and examined for the presence of unreacted 1,8-naphthoylene-benzimidazole-4-carboxylic acid (from its chloride by saponification) by stirring it in 150 parts by volume of water and 30 parts by volume of concentrated ammonia (28%) at 70° C. for ½ hour. The ketone was filtered off at 70° C., washed neutral and dried. This ketone did not give a vat with alkaline hydrosulfite.

Weight obtained=4.5 parts by weight or theoretical yield of $C_{50}H_{20}O_4N_5$.

The cyclization of the above ketone was effected as follows:

A mixture of 54 parts by weight of anhydrous aluminum chloride and 12 parts by weight of sodium chloride was heated to a melt of 200° C. At this temperature, 3.5 parts by weight of the above ketone was added to the melt. The mass was agitated at 200° C. for 4 hours while a fast stream of oxygen was conducted into it. Finally, the reaction product was poured and worked into a total of 250 parts by volume water and 13 parts by volume concentrated hydrochloric acid. After boiling for 10 minutes the dyestuff was filtered off, washed neutral and dried.

The resulting vat dyestuff dyed cotton red brown from a red brown vat.

*Example III*

A charge of 75 parts by volume of nitrobenzene, 7.0 parts by weight of 1,8-naphthoylene-benzimidazole-4-carboxylic acid chloride, 20.7 parts by weight of anhydrous aluminum chloride and 1.8 parts by weight of biphenylene sulfide was stirred at 75-80° C. for 3 hours. The reaction mixture was poured into water and, after addition of 5 parts by volume of concentrated hydrochloric acid the mixture was steam distilled until all of the nitrobenzene was removed. Then the ketone was filtered off and examined for the presence of unreacted 1,8-naphthoylene-benzimidazole-4-carboxylic acid (from its chloride by saponification) by stirring it in 150 parts by volume of water and 30 parts by volume of concentrated ammonia (28%) at 70° C. for ½ hour. The ketone was filtered off at 70° C., wahsed neutral and dried. This ketone did not give a vat with alkaline hydrosulfite.

Weight obtained=6.6 parts by weight or 85% of the theory of $C_{50}H_{24}O_4N_4S$.

The cyclization of the above ketone was effected as follows:

A mixture of 54 parts by weight of anhydrous aluminum chloride and 12 parts by weight of sodium chloride was heated to a melt of 180 to 200° C. At this temperature, 3.5 parts by weight of the above ketone was added to the melt. The mass was agitated at 180 to 200° C. for ½ hour while a fast stream of oxygen was conducted into it. Finally the reaction product was poured and worked into a total of 250 parts by volume of water and 13 parts by volume concentrated hydrochloric acid. After boiling for 10 minutes the dyestuff was filtered off, washed neutral and dried.

The resulting dyestuff was applied as an aqueous paste for printing of cotton by the customary printing procedures for vat dyestuffs. It gave pleasant bright reddish brown prints of good fastness to washing, chlorine and light.

*Example IV*

A charge of 45 parts by volume of nitrobenzene, 3.4 parts by weight of 1,8-naphthoylene-benzimidazole-4-carboxylic acid chloride, 12.3 parts by weight of anhydrous aluminum chloride and 2.1 parts by weight of fluoranthene was stirred at 75-80° C. for 3 hours. The reaction mixture was poured into water and, after addition of 5 parts by volume of concentrated hydrochloric acid the mixture was steam distilled until all of the nitrobenzene was removed. Then the ketone was filtered off and examined for the presence of unreacted 1,8-naphthoylene-benzimidazole-4-carboxylic acid (from its chloride by saponification) by stirring it in 150 parts by volume of water and 30 parts by volume of concentrated ammonia (28%) at 70° C. for ½ hour. The ketone was filtered off at 70° C., washed neutral and dried. This ketone did not give a vat with alkaline hydrosulfite.

Weight obtained=4.3 parts by weight or 84% of the theory of $C_{35}H_{18}O_2N_2$.

The cyclization of the above ketone was effected as follows:

A mixture of 39 parts by weight of anhydrous aluminum chloride and 9 parts by weight of sodium chloride was heated to a melt of 160° C. At this temperature 2.5 parts by weight of the above ketone were added to the melt. The mass was agitated at 160-180° C. for ¾ hour. Finally the reaction product was poured and worked into a total of 250 parts by volume of water and 13 parts by volume concentrated hydrochloric acid. After boiling for 10 minutes the dyestuff was filtered off, washed neutral and dried. The dried dyestuff was dissolved in concentrated sulfuric acid at room temperature and precipitated in fine particles by pouring the solution in water.

The dyestuff was applied as an aqueous paste for printing of cotton by the customary printing procedures for vat dyestuffs. The prints were deep chocolate brown of good fastness to washing, chlorine and light.

It is to be understood that the foregoing detailed description is merely given by way of illustration and that many variations may be made therein without departing from the spirit of my invention.

Having described my invention, what I desire to secure by Letters Patent is:

1. Vat dyestuffs of the general structure:

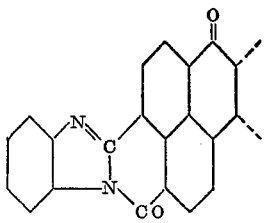

wherein the two broken lines indicate the addition of ring systems formed from a cyclic compound selected from the group consisting of thionaphthene, carbazole, biphenylene sulfide and fluoranthene.

2. A vat dyestuff of the formula:

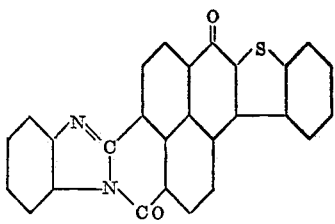

3. A vat dyestuff of the formula:

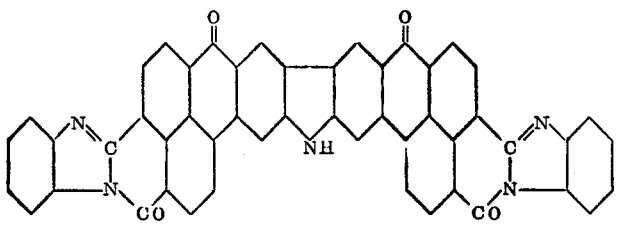

4. The vat dyestuff of the formula:

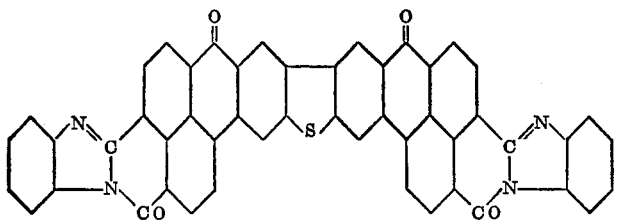

5. The vat dyestuff of the formula:

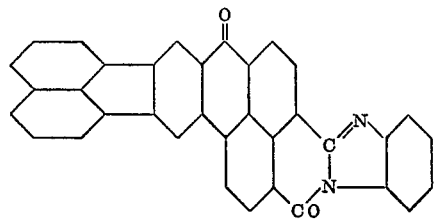

6. The process for the preparation of the dyestuffs of claim 1 which comprises reacting of 1,8-naphthoylene-benzimidazole-4-carboxylic acid chloride with a compound of the group consisting of thionaphthene, carbazole, biphenylene sulfide, fluoranthene in presence of anhydrous aluminum chloride and a solvent at temperature of 65 to 90° C. and subsequently ring-closing the ketones thus obtained in a melt of anhydrous aluminum chloride and alkali chloride at temperatures of 140 to 210° C.

7. The process for the preparation of the dyestuffs of claim 1 which comprises reacting of 1,8-naphthoylene-benzimidazole-4-carboxylic acid chloride with a compound of the group consisting of thionaphthene, carbazole, biphenylene sulfide, fluoranthene in presence of anhydrous aluminum chloride and a solvent at a temperature of 65 to 90° C. and subsequently ring-closing the ketones thus obtained in a melt of anhydrous aluminum chloride and alkali chloride in the presence of oxygen at temperatures of 140 to 210° C.

8. The process for the preparation of the dyestuff of claim 2 which comprises reacting of 1,8-naphthoylene-benzimidazole-4-carboxylic acid chloride with thionaphthene in nitrobenzene in presence of anhydrous aluminum chloride at a temperature of 65 to 90° C. to obtain the ketone of the probable structure:

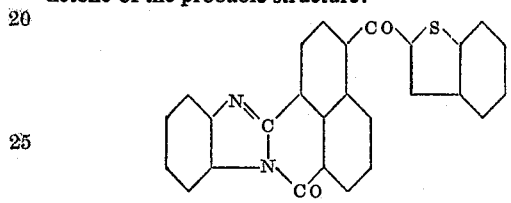

and subsequently ring-closing this ketone in a melt of anhydrous aluminum chloride and alkali chloride in presence of oxygen at a temperature of 150 to 170° C.

9. The process for the preparation of the dyestuff of claim 3 which comprises reacting 1,8-naphthoylene-benzimidazole-4-carboxylic acid chloride with carbazole in nitrobenzene in presence of anhydrous aluminum chloride at a temperature of 65 to 90° C. to obtain the ketone of the probable structure:

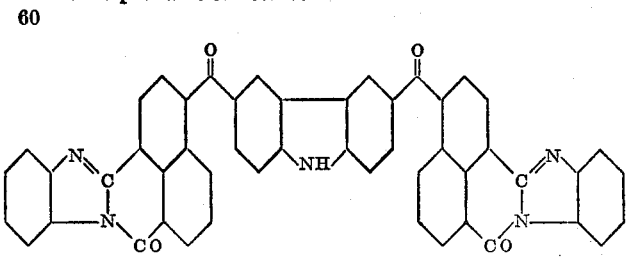

and subsequently ring-closing this ketone in a melt of anhydrous aluminum chloride and alkali chloride in presence of oxygen at a temperature of 190–210° C.

10. The process for the preparation of the dyestuff of claim 4 which comprises reacting 1,8-naphthoylene-benzimidazole-4-carboxylic acid chloride with biphenylene sulfide in nitrobenzene in presence of anhydrous aluminum chloride at a temperature of 65 to 90° C. to obtain the ketone of the probable structure:

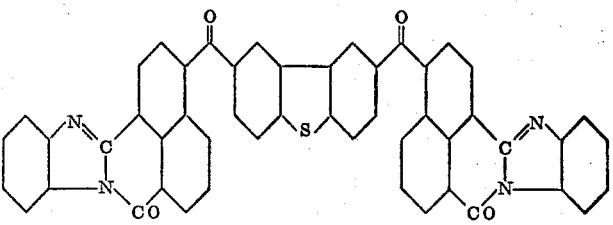

and subsequently ring-closing this ketone in a melt of anhydrous aluminum chloride and alkali chloride in presence of oxygen at a temperature of 170 to 210° C.

11. The process for the preparation of the dyestuff of claim 5 which comprises reacting 1,8-naphthoylene-benzimidazole-4-carboxylic acid chloride with fluoranthene in nitrobenzene in presence of anhydrous aluminum chloride at a temperature of 65 to 90° C. to obtain the ketone of the probable structure:

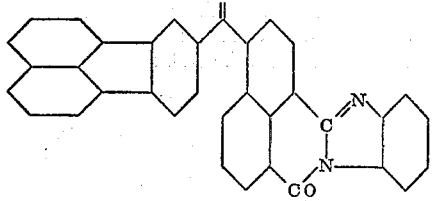

and subsequently ring-closing this ketone in a melt of anhydrous aluminum chloride and alkali chloride at a temperature of 150 to 190° C.

No references cited.